United States Patent [19]

Prusak

[11] 4,402,660
[45] Sep. 6, 1983

[54] APPARATUS FOR PRODUCING DISC RECORDS WITH A MOLDED-IN CENTER HOLE

[75] Inventor: John J. Prusak, Indianapolis, Ind.

[73] Assignee: RCA Corporation, New York, N.Y.

[21] Appl. No.: 398,693

[22] Filed: Jul. 15, 1982

[51] Int. Cl.³ ............................................. B29D 17/00
[52] U.S. Cl. .................................... 425/290; 264/107; 264/155; 264/163; 425/810
[58] Field of Search ................ 425/290, 810; 264/107, 264/155, 163

[56] References Cited

U.S. PATENT DOCUMENTS

| | | | |
|---|---|---|---|
| 4,085,178 | 4/1978 | McNeely et al. | 264/106 |
| 4,327,047 | 4/1982 | McNeely | 264/107 |
| 4,334,849 | 6/1982 | Bock | 425/810 X |
| 4,362,492 | 12/1982 | Prusak | 425/810 X |

FOREIGN PATENT DOCUMENTS 1187968 4/1970 United Kingdom .

Primary Examiner—Thomas P. Pavelko
Attorney, Agent, or Firm—Birgit E. Morris; Donald S. Cohen

[57] ABSTRACT

An apparatus for molding information discs includes a pair of mold plates, at least one of which is movable toward and away from the other, and adapted to form a mold cavity therebetween, a center hole forming pin slidably mounted in one of the mold plates and a center plate in the other mold plate in alignment with the center hole forming pin. The center hole forming pin has a recess in its end which faces the center plate and a plurality of passages extending substantially radially therethrough from the recess to the outer surface thereof. The passages allow the flow of mold material therethrough as the center hole forming pin is moved through the mold material in the forming of the center hole to reduce the force necessary to move the pin through the mold material.

7 Claims, 3 Drawing Figures

APPARATUS FOR PRODUCING DISC RECORDS WITH A MOLDED-IN CENTER HOLE

BACKGROUND OF THE INVENTION

The present invention relates to an apparatus for compression molding recorded discs which includes means for forming a center hole in the disc as the disc is being molded. More particularly, the present invention relates to such an apparatus which provides for greater ease of forming the hole in the disc.

A high information density recorded disc, such as a video disc, has a packing density of the information track in the order of 10,000 rotations per inch (3,937 per cm) so that the information track must be much finer in dimension than that of an audio disc, and rotates at a higher speed, about 450 r.p.m. during playback, as compared to 33 r.p.m. for an audio disc. Because of the fine dimensions of the information track and the high speed rotation of the disc, the disc must be stably supported to insure proper tracking of the stylus during playback. To help achieve this stability, the disc is provided with a relatively large center hole, about 1.3 inches (3.3 cm) in diameter for seating in the player on a truncated conical spindle.

A method generally used to make the disc is compression molding. It has been found desirable to form the center hole in the disc as it is being molded. An apparatus suitable for forming the center hole in the disc as it is being molded is shown and described in copending applications for U.S. Letters Patent of Michael Lee McNeely, Ser. No. 93,012, filed Nov. 9, 1979, entitled Method and Apparatus for Producing Disc Records having Molded-in Center Holes, Robert Winfield Chambers et al, Ser. No. 187,161, filed Sept. 15, 1980, entitled Apparatus for Molding a Recorded Disc, and John J. Prusak, Ser. No. 310,856, filed Oct. 13, 1981, entitled Apparatus for Compression Molding Recorded Discs, which are incorporated herein by reference.

The apparatus of each of the above applications includes a pair of mold plates, a center hole forming pin slidably mounted in one of the mold plates and a center plate in the other mold plate. The center hole forming pin and the center plate have surfaces which mate when forming the hole in the disc. The center hole forming pin has a recess in its mating surface. A disc is molded in this apparatus by placing a preform of plastic material between the mold plates, which are heated. The heated mold plates are brought together against the preform to heat the preform and then compress it so that the plastic material flows radially outwardly to fill the mold cavity formed between the mold plates. As the plastic material is being compressed, the center hole forming pin is moved through the plastic material toward the center plate in the other mold plate. As the center hole forming pin moves through the plastic material, it pushes the plastic material aside to form the hole. However, some of the plastic material fills the recess in the end of the pin and remains therein when the end surface of the pin mates with the opposed surface of the center plate. The center hole forming pin remains in contact with the center plate until the mold plates move completely together to form the disc and the mold plates are cooled to harden the disc. When the plastic material is cooled, the material that is in the recess in the end of the center hole forming pin is also hardened and is retained in the recess.

A problem which has arisen with regard to the above described apparatus is that it takes a relatively high pressure, about 6,000 pounds, to force the center hole forming pin through the plastic material. This high pressure not only can have an adverse affect on the quality of the hole formed in the disc, but also causes considerable wear on the pin itself. Since a present production mold press makes one disc about every 40 seconds, the repeated application of this high pressure to the pin over a single day's operation can cause considerable mechanical fatigue to the pin which could damage the pin.

SUMMARY OF THE INVENTION

An apparatus for molding a recorded disc includes a pair of mold plates adapted to form therebetween a disc mold cavity, a center hole forming pin movable in one of the mold plates toward and away from the other mold plate, and a center plate in the other mold plate with each of the center hole forming pin and the center plate having opposed surfaces which mate to form the center hole in the disc. The center hole forming pin has means for allowing the flow of mold material through the pin from in front of the opposed surfae back into the mold cavity as the center hole forming pin moves through the mold material to form the center hole.

DETAILED DESCRIPTION OF THE PREFERRED EMBODIMENT

Figure 1:
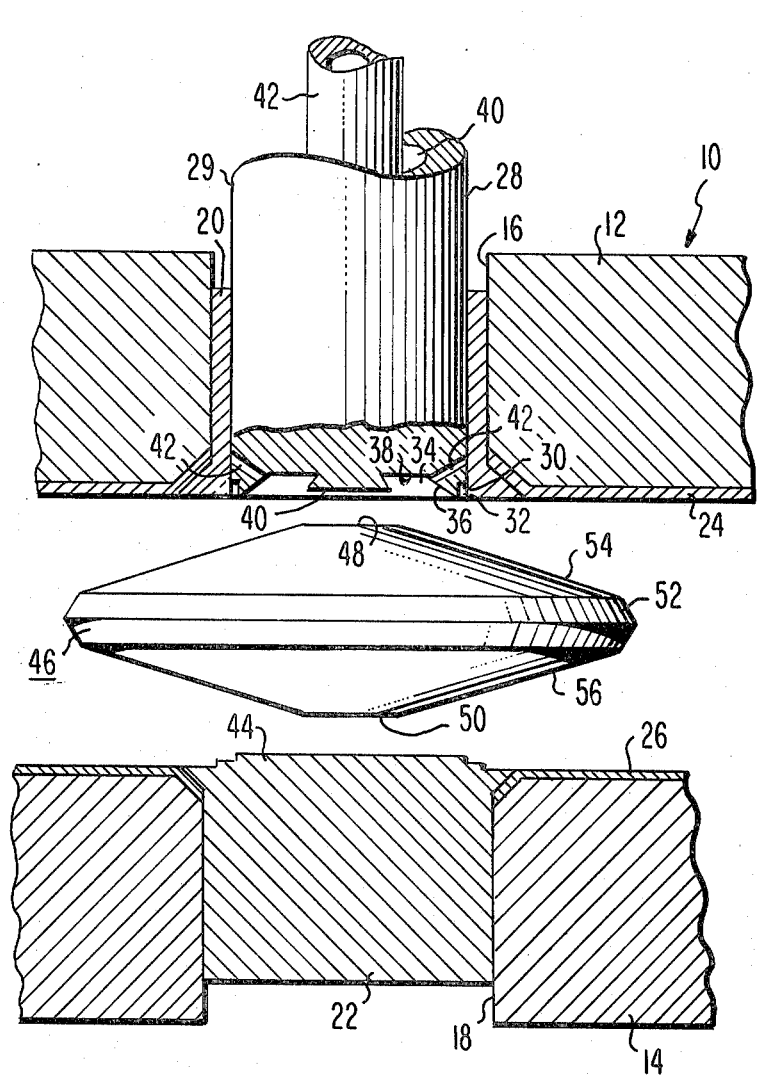
FIG. 1 is a sectional view of a portion of one form of a disc molding apparatus which incorporates the present invention.

Referring initially to FIG. 1 of the drawing, an apparatus for molding a recorded disc which incorporates one embodiment of the present invention is generally designated as 10. The molding appartus 10 includes upper and lower mold plates 12 and 14 which are mounted so that at least one of them is movable toward and away from the other. The mold plates 12 and 14 have aligned center openings 16 and 18 respectively therethrough in which are mounted center plates 20 and 22 respectively. Stampers 24 and 26 are mounted on the opposed surfaces of the mold plates 12 and 14 respectively. The stampers 24 and 26 are thin metal plates having on the surface thereof the negative of the impression to be applied to the surface of the molded disc. The stampers 24 and 26 are in part secured to the mold plates 12 and 14 by the center plates 20 and 22 respectively.

A center hole forming pin 28 extends through and is slidable in the center plate 20 in the upper mold plate 12. The center hole forming pin 28 is an elongated, hollow, cylindrical rod 29 having a closed end 30. The center hole forming pin 28 has an outer diameter slightly larger than the diameter of the hole to be formed in the recorded disc. A cylindrical hub 32 extends outwardly from the center of the end 30. The hub 32 is of a diameter equal to the diameter of the hole to be formed in the recorded disc and is of a length substantially equal to one-half of the thickness of the recorded disc being molded. The hub 32 has a recess 34 in its end surface. The sidewall 36 of the recess 34 is conical and tapers radially inwardly from the edge of the hub 32 to the flat bottom 38 of the recess 34. A nub 40 projects from the center of the bottom wall 38 and is of a length slightly less than the depth of the recess 34. A plurality of circumferentially spaced passages 42 extend radially outwardly from the sidewall 36 of the recess 34 to the outer surface of the rod 29. As will be explained, the number and size of the passages 42 may vary. Also, the passages 42 should extend to a point along the outer surface of the rod 29 where the passages 42 will open into the mold cavity formed between the mold plates 12 and 14 when the center hole forming pin 28 is being moved through the mold material in the cavity.

The lower center plate 22 in the lower mold plate 14 has a cylindrical hub 44 projecting from its top surface. The hub 44 is of a diameter equal to the diameter of the hole to be formed in the recorded disc and is of a length approximately equal to one-half the thickness of the disc being molded. The hub 44 is directly opposed to the hub 32 on the end of the center hole forming pin 28 so that it will mate with the center hole forming pin.

To mold a recorded disc with the apparatus 10, the mold plates 12 and 14 are separated, i.e. placed in their open position, and a preform 46 of the mold material, a thermoplastic material, is placed between the mold plates 12 and 14. As shown in FIg. 1, the preform 46 is a solid body of the mold material having flat, circular top and bottom surfaces 48 and 50, a peripheral surface 52 larger in diameter than the top and bottom surfaces 48 and 50 and located intermediate the top and bottom surfaces, and conical surfaces 54 and 56 extending between the peripheral surface 52 and each of the top and bottom surfaces 48 and 50 respectively. The mold plates 12 and 14 and the center hole pin 28 are heated and the mold plates 12 and 14 are moved together to contact the preform 46. The preform 46 is heated by the mold plates 12 and 14 and further movement of the mold plates 12 and 14 together compresses the preform 46 causing the mold material to flow radially outwardly to fill the cavity formed between the mold plates 12 and 14.

Figure 2:
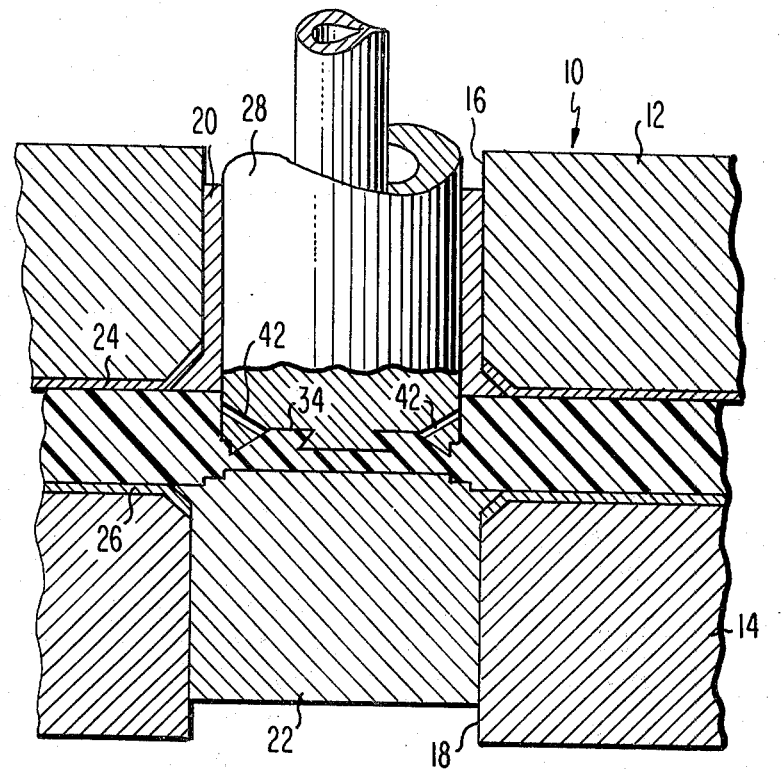
FIG. 2 is a sectional view of the apparatus shown in FIG. 1 showing the center hole forming pin as it is forming the center hole.

While the mold material is being compressed by the mold plates 12 and 14 but before the mold plates 12 and 14 reach their completely closed position, the center hole forming pin 28 is moved through the molding material toward the bottom center plate 22, as shown in FIG. 2. As the center hole forming pin 28 moves through the molding material it pushes some of the molding material aside into the mold cavity to form the center hole. However, some of the mold material fills the recess 34 in the end of the pin. When the center hole forming pin 28 moves through the mold material to a point where the outer ends of the passages 42 are within the mold cavity, some of the mold material in the recess 34 is forced radially outwardly through the passages 42 back into the mold cavity. This flow of the mold material through the passages 42 continues until the end of the center hole forming pin 28 engages the hub 44 of the lower center plate 22. The center hole forming pin 28 is maintained in mating engagement with the lower center plate 22 until the mold plates 12 and 14 are moved to their completely closed position and the mold plates 12 and 14 and the center hole forming pin 28 are cooled to cool and harden the mold material. The center hole forming pin 28 is then retracted and the mold plates 12 and 14 separated to their open position to permit removal of the recorded disc. When the center hole pin 28 is cooled, the mold material retained in the recess 34 is also cooled and hardens, and is retained in the recess 34 when the center hole forming pin 28 is retracted.

The flow of the mold material through the passages 42 as the center forming pin 28 is moved through the mold material greatly reduces the pressure needed to move the center hole forming pin 28 through the mold material. The extent of the reduction in pressure required to move the center hole pin 28 through the mold material depends on the number and size of the passages 42. For example, for a center hole forming pin 28 having four equally spaced passages 42 therethrough, each of one-tenth of an inch in diameter, a pressure of 3,500 pounds moves the center hole forming pin 28 through the mold material. For a center hole forming pin 28 having four holes each three-sixteenth inch in diameter, a pressure of 2,000 pounds moves the center hole forming pin through the mold material. It can be seen that these pressures are considerably less than the 6,000 pounds needed to move a center hole forming pin which did not have the passages therein.

Figure 3:
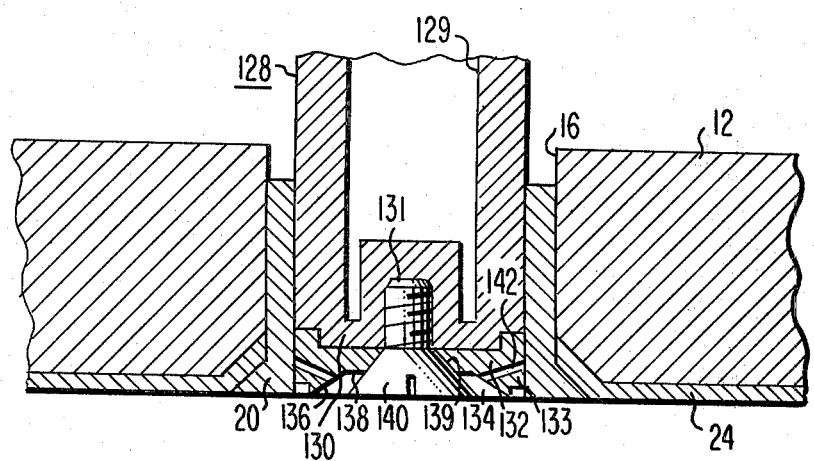
FIG. 3 is a sectional view of a portion of a disc molding apparatus showing another modification of a center hole forming pin incorporating the present invention.

Referring to FIG. 3, a modification of a center hole forming pin which incorporates the present invention is generally designated as 128. The center hole forming pin 128 is an elongated hollow cylindrical rod 129 having a closed end 130. The center hole forming pin 128 has an outer diameter slightly larger than the diameter of the hole to be formed in the recorded disc. A threaded hole 131 extends from the center of the outer surface of the end 130. An end plate 133 is removably mounted on the end 130 of the rod 129. The end plate 133 is circular and has an outer diameter equal to the outer diameter of the rod 129. A cylindrical hub 132 extends from the front surface of the end plate 133. The hub 132 is centered on the front surface of the end plate 133 and is of a diameter corresponding to the desired diameter of the hole to be formed in the recorded disc and is of a length approximately equal to one-half of the thickness of the recorded disc. The hub 132 has a recess 134 in its end. The sidewall 136 of the recess 134 is conical and tapers radially inwardly from the edge of the hub 132 to the flat bottom 138 of the recess 134. A hole 139 extends through the end plate 133 from the center of the bottom 138 of the recess 134 and is aligned with the threaded hole 131 in the end 130 of the rod 129. A tapered headed screw 140 extends through the hole 139 and is threaded into the hole 131 so as to secure the end plate 133 to the rod 129. The head of the screw 140 projects beyond the bottom surface 138 of the recess 134 but does not project out of the recess 134. Thus, the head of the screw 140 forms a nub projecting into the recess 134. A plurality of circumferentially spaced passages 142 extend substantially radially through the end plate 133 from the recess 134 to the outer surface of the end plate 133.

In molding a recorded disc, the center hole pin 128 operates in the same manner as previously described with regard to the center hole forming pin 28 shown in FIGS. 1 and 2. Thus, as the center hole forming pin 128 is moved through the mold material, the mold material which enters the recess 134 flows through the passages 142 to permit the movement of the center hole forming pin 128 through the mold material at lower pressures. However, in the center hole forming pin 128, the end plate 133 is of a material which is harder than the material of the rod 129. Thus, the end plate 133 will take more wear and will therefore last longer during its operation. Also, when the end plate 133 does become worn it can be easily replaced by merely removing the screw 140 so that there is a minimum of down time when the end plate is being replaced.

Thus, there is provided by the present invention an apparatus for molding recorded discs having molded-in center holes wherein the force needed to move the center hole forming pin through the mold material is greatly reduced. This provides for a longer life for the center hole forming pins and also achieves better forming of the center holes in the recorded disc.

I claim:

1. In an apparatus for molding a recorded disc from a mold material which apparatus includes a pair of mold plates adapted to form therebetween a disc mold cavity, a center hole forming pin movable in one of the mold plates toward and away from the other mold plate and a center plate in the other mold plate and aligned with the center hole forming pin, the center hole forming pin having an end surface which mates with a surface of the center plate to form the center hole in the disc, the improvement comprising, the center hole forming pin having means therethrough for allowing the flow of some of the mold material from in front of the end surface through the center hole forming pin back into the mold cavity as the center hole forming pin moves through the mold material to form the center hole.

2. An apparatus in accordance with claim 1 in which the means in the center hole forming pin for allowing the flow of the mold material is at least one passage passing through the center hole forming pin.

3. An apparatus in accordance with claim 2 in which the center hole forming pin has a recess in its end surface and the passage extends from the recess to the outer surface of the pin.

4. An apparatus in accordance with claim 3 in which the recess has an outer surface extending to a bottom surface and the passage extends substantially radially from the outer surface of the recess to the outer surface of the pin.

5. An apparatus in accordance with claim 4 including a plurality of the passages extending through the pin and circumferentially spaced around the outer surface of the recess.

6. An apparatus in accordance with claim 5 in which the center hole forming pin comprises a hollow, cylindrical rod having a closed end and the recess and passages are in the closed end.

7. An apparatus in accordance with claim 5 in which the center hole forming pin comprises a hollow, cylindrical rod having a closed end and an end plate secured to the closed end, and the recess and passages are in the end plate.

* * * * *